US012669738B2

(12) United States Patent
Park et al.

(10) Patent No.: US 12,669,738 B2
(45) Date of Patent: Jun. 30, 2026

(54) ACTUATOR FOR CAMERA

(71) Applicant: JAHWA electronics Co., Ltd., Chungcheongbuk-do (KR)

(72) Inventors: Chul Soon Park, Chungcheongbuk-do (KR); Je Seung Yeon, Chungcheongbuk-do (KR)

(73) Assignee: JAHWA electronics Co., Ltd., Chungcheongbuk-do (KR)

( * ) Notice: Subject to any disclaimer, the term of this patent is extended or adjusted under 35 U.S.C. 154(b) by 226 days.

(21) Appl. No.: 18/294,624

(22) PCT Filed: Feb. 27, 2023

(86) PCT No.: PCT/KR2023/002739
§ 371 (c)(1),
(2) Date: Feb. 2, 2024

(87) PCT Pub. No.: WO2023/191318
PCT Pub. Date: Oct. 5, 2023

(65) Prior Publication Data
US 2024/0377704 A1 Nov. 14, 2024

(30) Foreign Application Priority Data
Mar. 29, 2022 (KR) ........................ 10-2022-0038632

(51) Int. Cl.
*G03B 5/00* (2021.01)
*G03B 3/10* (2021.01)

(52) U.S. Cl.
CPC ................. *G03B 5/00* (2013.01); *G03B 3/10* (2013.01); *G03B 2205/0046* (2013.01); *G03B 2205/0069* (2013.01)

(58) Field of Classification Search
None
See application file for complete search history.

(56) References Cited

U.S. PATENT DOCUMENTS

| | | | |
|---|---|---|---|
| 12,197,035 B2 * | 1/2025 | Su ........................... | G03B 17/17 |
| 2006/0127074 A1 * | 6/2006 | Noji ....................... | H04N 23/68 |
| | | | 348/E5.046 |

(Continued)

FOREIGN PATENT DOCUMENTS

| | | |
|---|---|---|
| KR | 10-1343197 B1 | 12/2013 |
| KR | 10-1709833 B1 | 2/2017 |

(Continued)

OTHER PUBLICATIONS

International Search Report for PCT/KR2023/002739 mailed on Jun. 7, 2023.

*Primary Examiner* — Rodney E Fuller
(74) *Attorney, Agent, or Firm* — The PL Law Group, PLLC

(57) ABSTRACT

An actuator for a camera includes a carrier equipped with at least one lens and configured to move in an optical axis direction, a magnet provided in the carrier, a housing configured to accommodate the carrier, a plurality of coils arranged along an optical axis to face the magnet, and a plurality of detection sensors configured to sense a position of the magnet and disposed to be spaced apart from each other based on the optical axis direction. When the carrier is located at a reference position, the plurality of detection sensors all face the same one magnetic pole among magnetic poles of the magnet.

6 Claims, 7 Drawing Sheets

(56) References Cited

U.S. PATENT DOCUMENTS

2009/0085558 A1* 4/2009 David ............... H02K 41/0352
                                                        324/207.2
2011/0001836 A1    1/2011 Chiang
2016/0202494 A1    7/2016 Seo et al.
2020/0137274 A1* 4/2020 Lee ........................ G03B 17/17
2020/0351421 A1* 11/2020 Park ....................... H04N 23/51

FOREIGN PATENT DOCUMENTS

KR          20180012150 A   * 2/2018   ............. G03B 3/12
KR     10-2021-0026212 A     3/2021
KR           102233576 B1  * 3/2021   ............ H02K 33/16

* cited by examiner

ACTUATOR FOR CAMERA

CROSS REFERENCE TO RELATED APPLICATIONS AND CLAIM OF PRIORITY

This application claims benefit under 35 U.S.C. 119, 120, 121, or 365 (c), and is a National Stage entry from International Application No. PCT/KR2023/002739, filed Feb. 27, 2023, which claims priority to the benefit of Korean Patent Application No. 10-2022-0038632 filed on Mar. 29, 2022, in the Korean Intellectual Property Office, the entire contents of which are incorporated herein by reference.

BACKGROUND

1. Technical Field

The present disclosure relates to an actuator for a camera, and more specifically, to an actuator for a camera that improves operation performance by using the positional relationship of a magnet and a hall sensor.

2. Background Art

Advances in hardware technology for image processing and growing consumer need for making and taking photos and videos have driven implementation of such functions as autofocusing (AF) and optical image stabilization (OIS) in stand-alone cameras as well as camera modules mounted on mobile terminals including cellular phones and smartphones.

Recently, an actuator for a zoom lens that may vary the size of a subject through zoom-in and zoom-out functions has also been disclosed, and an actuator that implement AF and/or zoom functions more diversely by applying mutual positional relationship of a plurality of lenses (lens assemblies) in combination depending on an embodiment has also been disclosed.

In the case of such an actuator for a zoom lens, the moving distance (also referred to as stroke) of the zoom lens moving in the optical axis direction is elongated or extended than that of a general lens, so it must be designed to secure a driving force as much, and furthermore, it must be designed to accurately detect and feedback-control the corresponding position of the zoom lens in the entire stroke section.

However, in the case of a conventional actuator, only design changes such as simply physically changing the shape or structure of a carrier (mounted to a lens or a lens module) serving as a moving body to be suitable for the extended travel distance or installing a relatively large magnet to enhance the driving force are being applied.

Meanwhile, the hall sensor must be designed to linearly detect the polarity of a magnetic field generated by the facing magnet (mounted to the carrier) and the increase or decrease in size of the magnetic field in order to precisely implement position detection and feedback control using the hall sensor.

However, in the case of a conventional actuator, only a generalized method of placing a detection sensor (a hall sensor) at an appropriate position is applied, so there are limitations in precisely implementing the operation performance of the zoom actuator by accurately detecting the position of the corresponding carrier (lens) throughout the entire extended movement range and utilizing the same for feedback control.

If a small error occurs in position detection or the like, the influence by the error may not be large in an actuator that only makes microscopic movements, but in a zoom-driven actuator, as the moving distance of the magnet is extended, the small error may significantly deteriorate the operation performance of the entire function. From this perspective, so more precise and sophisticated design is needed.

SUMMARY

The present disclosure is designed to solve the problems of the related art, and therefore the present disclosure is directed to providing an actuator for a camera that may further improve driving efficiency and precision over the entire extended stroke range by precisely applying the mutual positional relationship of a magnet, a hall sensor (detection sensor), and a coil.

Other technical goals and advantages of the present invention can be understood with reference to the description below, which will be made explicit by the accompanied examples. Furthermore, the technical goals and advantages of the present invention can be accomplished by the embodiments and their combinations recited in the attached claims.

In one aspect of the present disclosure, there is provided an actuator for a camera, including: a carrier equipped with at least one lens and configured to move in an optical axis direction; a magnet provided in the carrier; a housing configured to accommodate the carrier: a plurality of coils arranged along an optical axis to face the magnet; and a plurality of detection sensors configured to sense a position of the magnet and disposed to be spaced apart from each other based on the optical axis direction, wherein when the carrier is located at a reference position, the plurality of detection sensors all face the same one magnetic pole among magnetic poles of the magnet.

In addition, the plurality of detection sensors according to the present disclosure may be all provided inside one coil among the plurality of coils.

Here, the reference position according to the present disclosure may be a position where the carrier is located at one end of a movable area in which the carrier is movable.

Preferably, when the carrier is located at the other end of the movable area, the plurality of detection sensors according to the present disclosure may all face the same one magnetic pole among the magnetic poles of the magnet, and the magnetic pole may have a different polarity from a magnetic pole that the plurality of detection sensors all face when the carrier is located at one end of the movable area.

Specifically, the magnet according to the present disclosure may include a middle magnetic pole located in a center portion and having one of an N pole or an S pole; and an upper magnetic pole and a lower magnetic pole having an opposite polarity to the middle magnetic pole and located at upper and lower portions of the middle magnetic pole, respectively, based on the optical axis direction.

More preferably, when the carrier is located at the reference position, a lower portion of an upper coil located above based on the optical axis among the plurality of coils and an upper portion of a lower coil located below based on the optical axis may face the middle magnetic pole.

According to a preferred embodiment of the present disclosure, a plurality of detection sensors (hall sensors) are arranged to detect the position of the driving magnet, and based on the positional characteristics of the operation section or movable area of the magnet, a plurality of detection sensors are disposed at positions that all face the same one magnetic pole among the magnetic poles of the magnet. By doing so, the linear characteristic section of each signal output by the plurality of detection sensors may be accurately reflected in time series, and furthermore, the results of the calculation processing of these signals may be led to have clearer linearity, so it is possible to implement more sophisticated feedback control over the entire expanded movable area.

According to a preferred embodiment of the present disclosure, by improving the mutual positional relationship between the magnet provided in the carrier and the coil placed to face the magnet, a driving force may be accurately generated throughout the movement section of the carrier, so it is possible to effectively improve movement characteristics of the carrier as well as driving precision.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
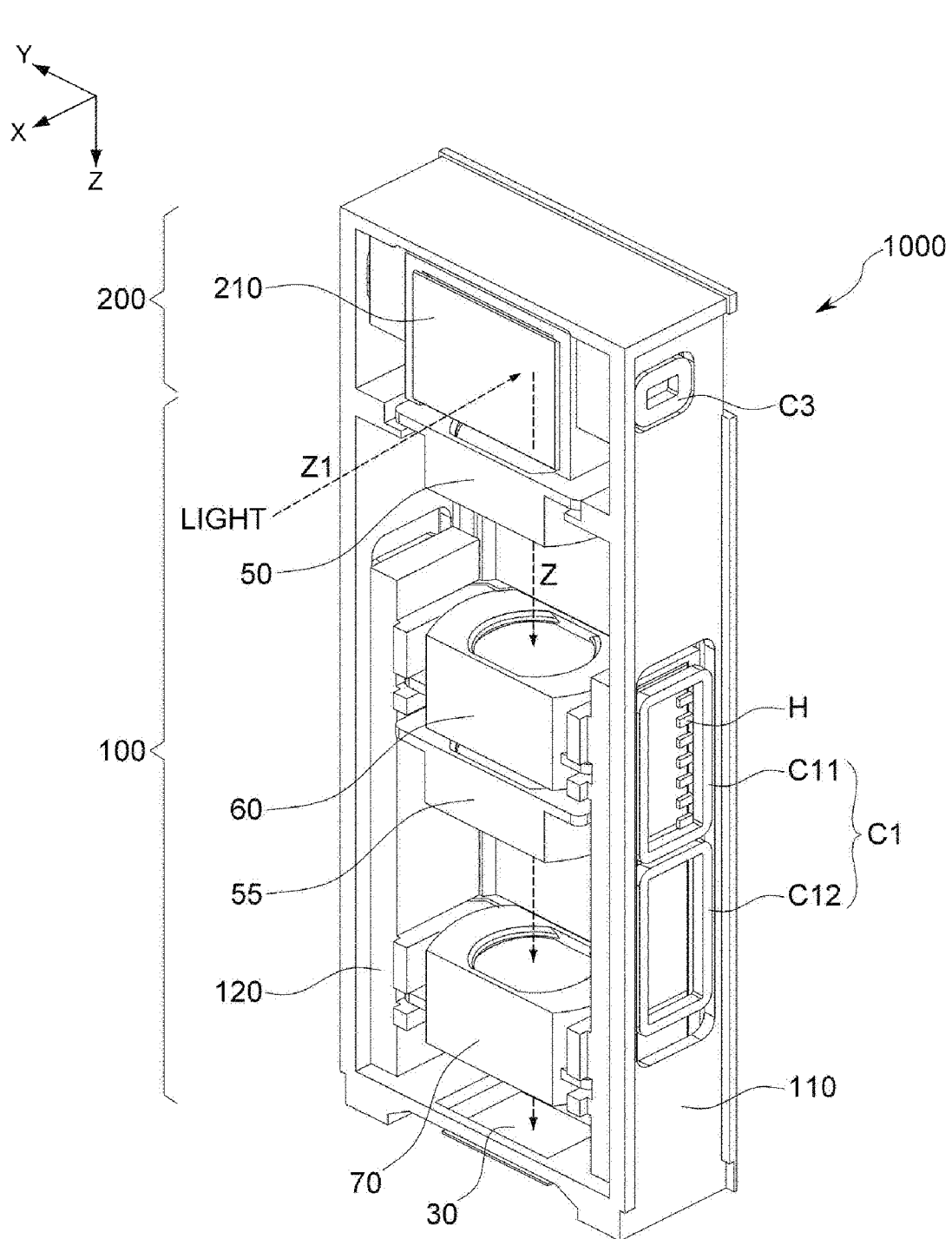
FIG. 1 is a drawing showing the overall configuration of an actuator and a camera module according to a preferred embodiment of the present disclosure.

FIG. 1 is a diagram showing the overall configuration of an actuator 100 for a camera (hereinafter, referred to as 'actuator') and a camera module 1000 according to a preferred embodiment of the present disclosure.

The actuator 100 of the present disclosure may be implemented as a single device by itself, and may also be implemented as a camera module 1000 that includes a reflectometer module 200 or the like as shown in FIG. 1.

As described later, the actuator 100 of the present disclosure corresponds to an actuator that implements functions such as auto focus (AF) or zoom by linearly moving a carrier equipped with a lens (lens assembly) in an optical axis direction (Z-axis direction based on the drawing).

The reflectometer module 200, which may be provided on the upper portion of the actuator 100 (based on the optical axis direction in FIG. 1) according to the present disclosure, performs the function of reflecting or refracting a light path ZI of a subject to a path Z (optical axis direction) toward the lens. The light reflected or refracted in the optical axis direction in this way is introduced into an image sensor 30, such as CMOS or CCD, through lenses (lens assemblies) 50, 55, 60, 70 provided in the carrier 120.

The reflectometer module 200 that changes the path of light may include a reflectometer 210 that may be made of one selected from mirrors and prisms or a combination thereof. The reflectometer 210 may be implemented using various members that is capable of changing the light coming from the outside to the optical axis direction, but it is preferable that the reflectometer 210 is implemented using a glass material to improve optical performance.

Since the camera module 1000 of the present disclosure, which includes the reflectometer module 200 or the like, is configured to refract the path of light so that light is introduced toward the lens, the camera module 1000 itself may not be installed in the thickness direction of a mobile terminal (smartphone, etc.) but may be installed in the length direction, which does not increasing the thickness of the mobile terminal. Thus, the camera module 1000 may be optimized for miniaturization or slimming of the mobile terminal.

Depending on an embodiment, the reflectometer 210 may be configured to rotate by a driving means that generates s magnetic force, such as a magnet and a third coil C3. If the reflectometer 210 moves or rotates in this way, the light of the subject reflected (refracted) through the reflectometer 210 moves in the +Y direction and/or +X direction, thereby implementing image stabilization in the X-axis and/or Y-axis direction.

The light of the subject reflected through the reflectometer module 200 is incident on the first lens 60 and the second lens 70 provided inside the actuator 100, and according to the actuator 100 of the present disclosure, the positions of the first lens 60 and the second lens 70 within the housing 110 are adjusted (based on the optical axis direction) in combination, thereby implementing functions such as zoom or AF.

Depending on an embodiment, fixed or movable additional lenses 50, 55 may be disposed on the light path from the reflectometer module 200 to the image sensor 30 in order to improve optical performance.

The number, positions, or the like of the additional lenses 50, 55 described above may be applied differently from those of the embodiment shown in the drawing depending on optical specifications and performance.

In addition, even though the drawing shows an embodiment in which the reflectometer module 200 is provided together in one housing 110, but depending on an embodiment, the reflectometer module 200 may be physically separated from the actuator 100 according to the present disclosure or may be implemented in an integrated form.

Furthermore, the drawing shows the carrier 120 on which two lenses are mounted, but this is an example, and a different number of lenses may be mounted thereon, and depending on an embodiment, a plurality of carriers may also be provided.

In the present disclosure, the direction axis corresponding to the path through which light is introduced into the first lens 60 or the like is defined as an optical axis (Z-axis), and the two axes perpendicular to the optical axis (Z-axis) are defined as X-axis and Y-axis.

Figure 2:
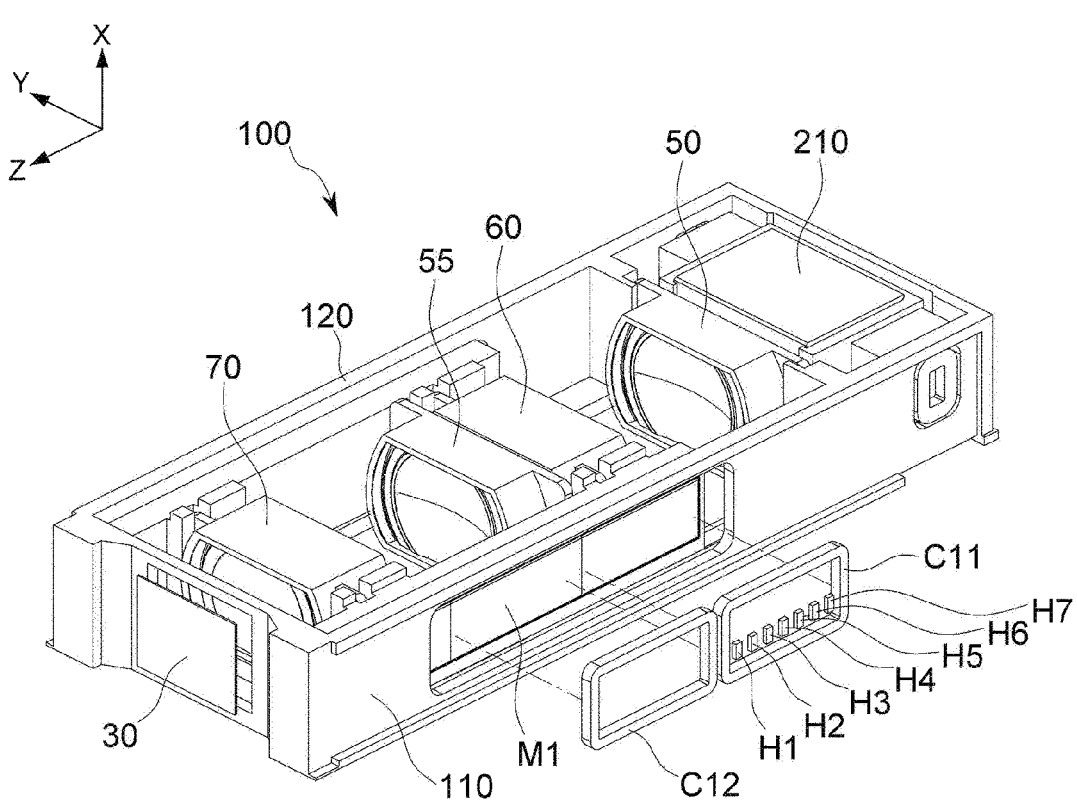
FIG. 2 is a drawing showing the overall configuration of the actuator according to a preferred embodiment of the present disclosure.

FIG. 2 is a diagram showing the overall configuration of the actuator 100 according to a preferred embodiment of the present disclosure.

As shown in FIG. 2, the actuator 100 of the present disclosure may include a housing 110 corresponding to the basic frame structure of the actuator 100 and accommodating the internal structure, a carrier 120, plurality of detection sensors H for sensing the position of a magnet M1 provided in the carrier 120, a plurality of coils C11, C12, and the like.

As shown in the drawing, the carrier 120 is equipped with at least one lens 60, 70 and corresponds to a moving object that moves linearly based on the optical axis direction (Z-axis direction). From a corresponding relative perspective, the housing 110 corresponds to a stator.

As will be described later, the carrier 120 includes a magnet M1, and the housing 110 includes coils C11, C12 that face the magnet M1 and provide a driving force to the magnet M1.

To correspond to the expanded movable area (stroke) of the carrier 120, the coil C1 is preferably implemented with a plurality of coils C11, C12 arranged up and down along the optical axis direction as illustrated in the drawing.

In addition, in order to improve straightness, suppress tilting, and improve driving efficiency, magnets M1, M2 may be provided on both sides of the carrier 120, respectively, so that the coil faces each of the magnets M1, M2.

Based on the drawing, the coils facing the second magnet M2 are the second coils C21, C22, and the second coils may include a plurality of coils C21, C22. In the following description, an embodiment of the present disclosure will be described focusing on the magnet M1 and the coil C1, but it may also be applied correspondingly to embodiments with dual structures M1, M2, C1, C2.

When a power of appropriate size and direction is applied to the coil C1 under the control of an operation driver, an electromagnetic force is generated between the coil C1 and the magnet M1, and the generated electromagnetic force causes the carrier 120 to move forward and backward in the optical axis direction.

If the carrier 120 moves linearly in the optical axis direction as above, the lenses 60, 70 mounted to the carrier also move linearly in the optical axis direction, so the AF or zoom function is implemented by the relative positional relationship of the lenses 50, 55, 60, 70.

A yoke plate (driver) made of metal may be provided on the opposite side of the coil C1 facing the magnet M1 in order to prevent the electromagnetic force generated by coil C1 from leaking to the outside and to allow the electromagnetic force to be more concentrated toward the magnet M1.

The detection sensor H is preferably implemented using a hall sensor that detects the size and direction of the magnetic field generated from the magnet M1 in the opposite direction using the hall effect and outputs a corresponding signal.

To enable precise position detection of the movement of the carrier 120 in the optical axis direction, it is preferable that a plurality of hall sensors H are provided to be spaced apart from each other in the optical axis direction in consideration of the resolution of the hall sensor, the linear section characteristics of the signal output by the hall sensor, and the size (length) of the entire movable area of the carrier 120. In the drawing, seven hall sensors H1 to H7 are shown as an example.

In this case, the operation driver processes the output signal input from each of the plurality of hall sensors H and controls a power of the size and direction corresponding to the result to be applied to the coils C11, C12.

The detection of the hall sensor H and the control processing of the operation driver are preferably configured to be applied cyclically through feedback control so that driving precision may be further improved through time-series and continuous control.

The operation driver may be implemented using an independent electronic component or element, and may also be implemented using a single electronic component (chip) integrated with the hall sensor H through the SOC (System On Chip).

In addition, the coils C11, C12, the hall sensors H1 to H7, and the like may be mounted on a circuit board (FPCB) (driver) that is electrically interfaced with an external module, power supply, external device, or the like.

Figure 3:
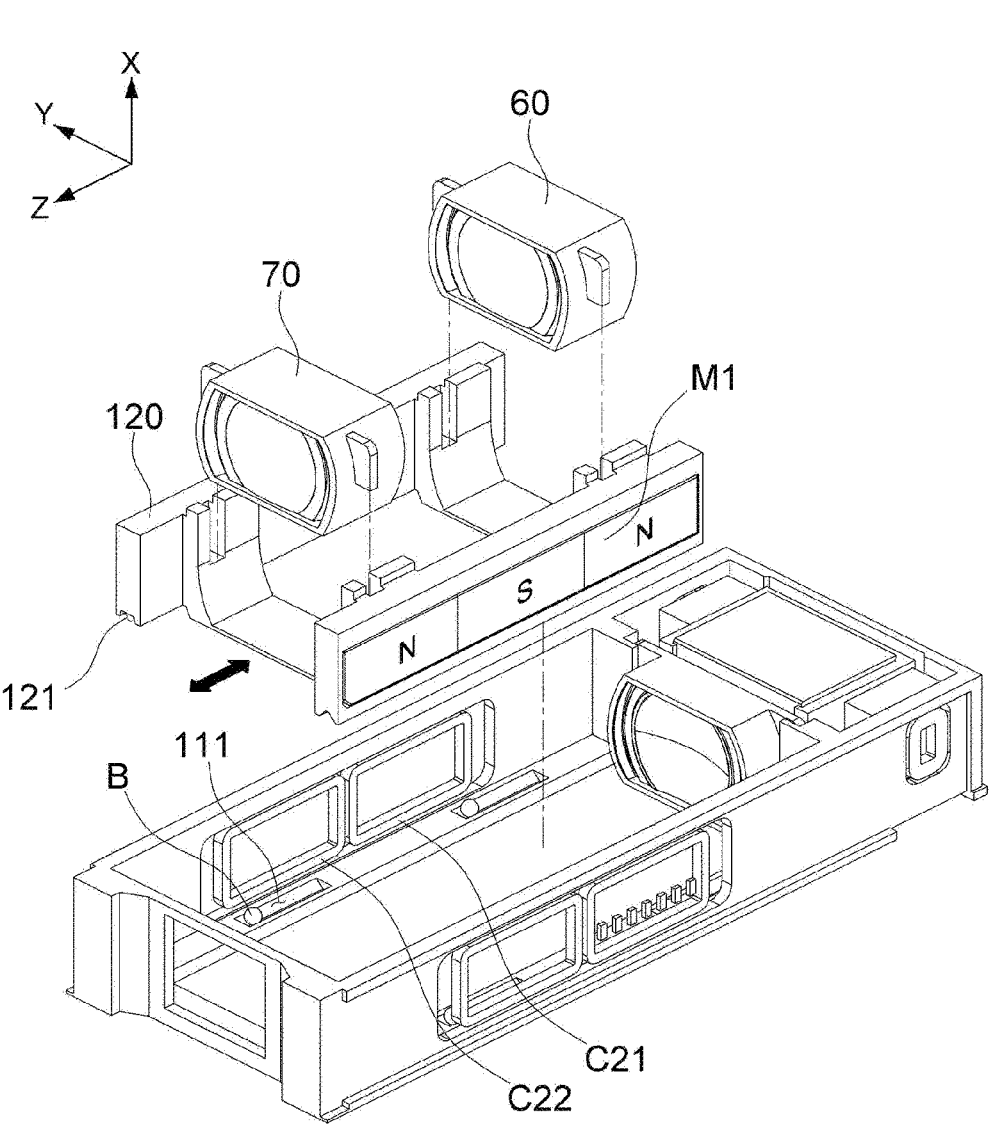
FIG. 3 is a drawing showing a carrier and related configuration according to an embodiment of the present disclosure.
Figure 4:
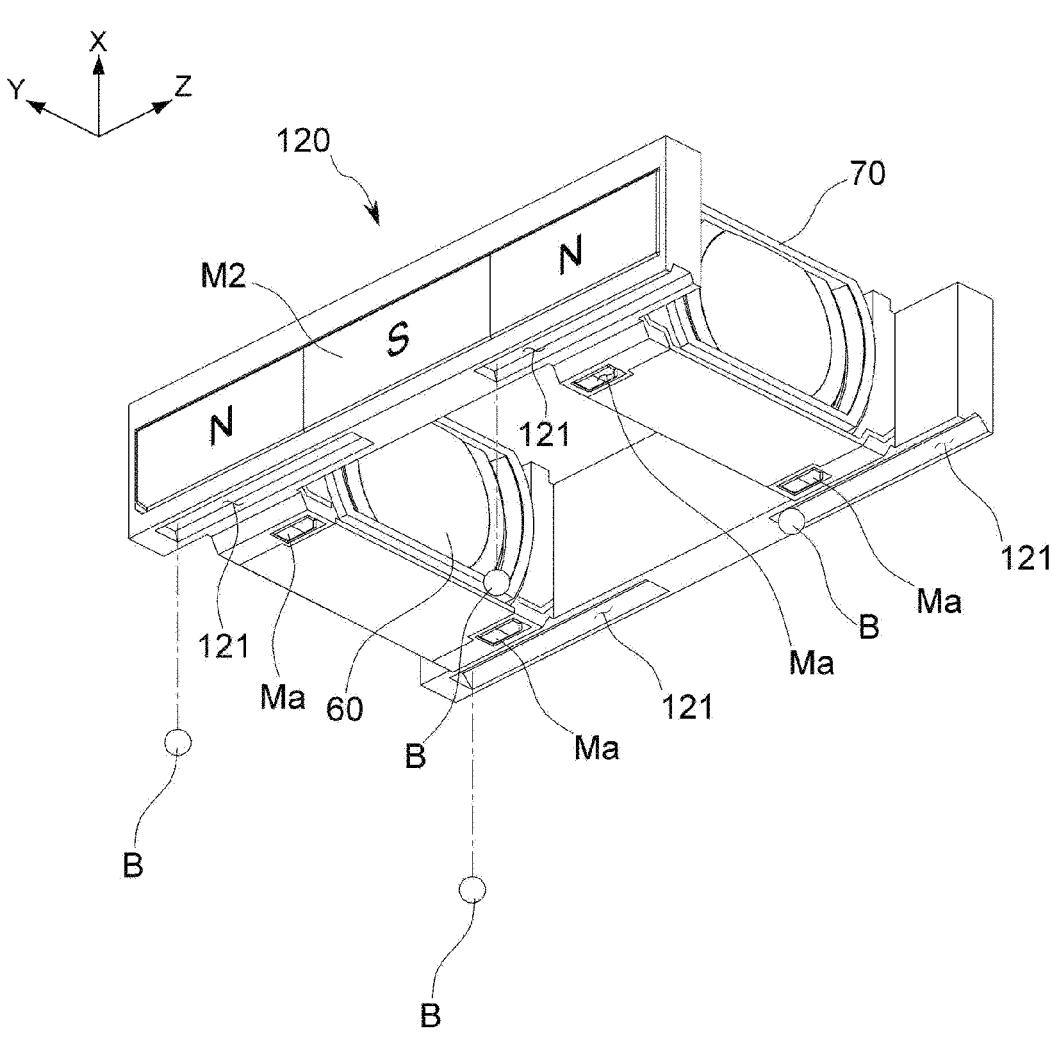
FIG. 4 is a drawing showing the detailed configuration of the carrier according to an embodiment of the present disclosure.

FIGS. 3 and 4 are diagrams showing the carrier 120 and relevant configuration according to an embodiment of the present disclosure.

As described above, the carrier 120 of the present disclosure is a moving body that moves linearly in the optical axis with respect to the housing 110, and as illustrated in FIG. 3, the carrier 120 may have a sliding groove that allows the first lens 60 or the second lens 70 to be detachably coupled thereto.

A ball B is preferably disposed between the carrier 120 and the housing 110 so that the carrier 120 may move linearly more flexibly with minimized friction.

Depending on an embodiment, the ball B may be disposed between the guide rail 121 provided at the lower portion of the carrier 120 and the groove rail 111 provided at the bottom surface of the housing 110. Here, it is preferable that the ball B is partially accommodated in at least one of the guide rail 121 and/or the groove rail 111 so that effective guiding for linear movement is implemented.

If the ball is interposed as above, the carrier 120 may linearly move more flexibly due to the minimized friction caused by the ball's rolling, moving, rotation, and point-contact with the facing object, and also there is an advantage of reducing noise and minimizing driving force, as well as improving driving precision.

Also, depending on an embodiment, at least one suction magnet Ma that generates attractive force to a yoke plate (driver) made of metal and provided in the housing 110 may be provided at the lower portion of the carrier 120.

If an attractive force is generated between the yoke plate and the suction magnet Ma, the carrier (moving body) 120 to which the ball B is attached comes into close contact with the housing (stator) 110, so the physical contact between the ball B and the carrier 120 and between the ball B and the housing 110 may be continued effectively.

Figure 5:
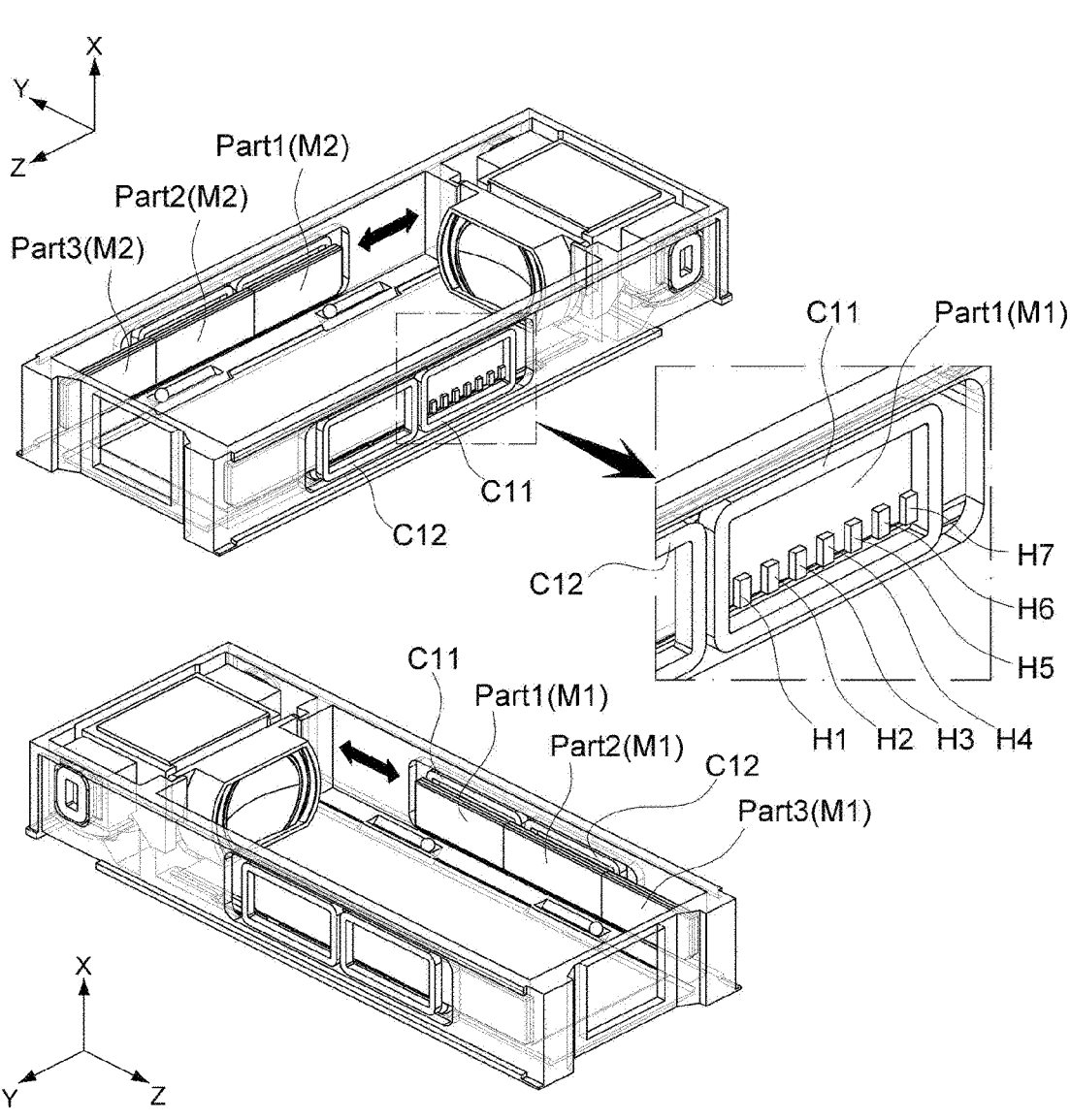
FIG. 5 is a diagram showing the structural relationship among a coil, a magnet, and a hall sensor (detection sensor)

FIG. 5 is a diagram showing the structural relationship between the coil C1, the magnet M1, and the hall sensor H.

As illustrated in the drawing, the magnet M1 is preferably configured to have a shape that extends in the optical axis direction, and it is preferable that the magnetic pole part of the magnet M1 facing the coil C1 is provided in plurality so that the area where a driving force is generated to the facing coils C1 C11, C12 may be expanded. The drawing shows three magnetic pole parts (Part1, Part2, Part3) as an example.

If the magnet M1 is configured to have three magnetic pole parts as above, three magnetic pole parts are exposed in the direction facing the coil C1, and the magnet M1 may be configured to have 6-pole magnetization as a whole.

As shown in the drawing, if the carrier 120 is located at the reference position, the hall sensors H of the present disclosure, which are provided in n pieces (n is a natural number of 2 or more), are preferably all provided at positions opposite to the same one magnetic pole (Part 1, based on FIG. 5) among the magnetic poles of the magnet M1 exposed toward the coil C1 (hereinafter referred to as a 'first reference magnetic pole').

In order to more precisely control the movement of the carrier 120, the zoom function or the like may be initiated or activated after the carrier 120 may be located at a specific default position.

For example, the carrier 120 may be configured to be restored to a specific position (default position) using a restoring force by an elastic means or a magnetic means, when the zoom function or the like is terminated.

In addition, through electromagnetic force control between the coil and the magnet, the carrier 120 may be configured to move to the default position when the zoom function is terminated, when a self-check algorithm is executed, or when a drive start signal is input.

The reference position of the present disclosure may be determined in various ways, and the default position may be a position where the zoom function or the like begins to be activated or initiated.

However, in order to clarify the driving relationship and further maximize the efficiency of linear control, the reference position is preferably set to a position where the carrier 120 is located at one of both ends of the area (movable area) where the carrier 120 is movable.

If all hall sensors H1 to H7 face the same one magnetic pole (for example, N pole) at the reference position such as the default position as above, when the driving force between the coil C1 and the magnet M1 causes the carrier 120, namely the magnet M1, to move in the optical axis direction, the signal section with linear form (e.g., linear function that increases or decreases) among the signal systems output by each hall sensor H according to the moving displacement of the magnet M1 may be more clearly distinguished, which may improve the precision of drive control.

In addition, in the above configuration, the signal systems of the n hall sensors (for example, H1 to H7) may be calculated (for example, summed) to generate an integrated signal system, and when the integrated signal system is applied to feedback control, the integrated signal system may be effectively induced to correspond substantially to a linear function (linear graph) with a slope of increase or decrease, with the displacement due to the movement of the carrier 120 being used as an independent variable.

In order to more effectively implement the relationship between the plurality of hall sensors H and the magnetic pole of the magnet M1, as shown in the drawing, the plurality of hall sensors H are all preferably provided inside one coil (C11, based on drawing) (inside the winding) among the plurality of coils C1, C2 that provide a driving force to the magnet M1.

Figure 6:
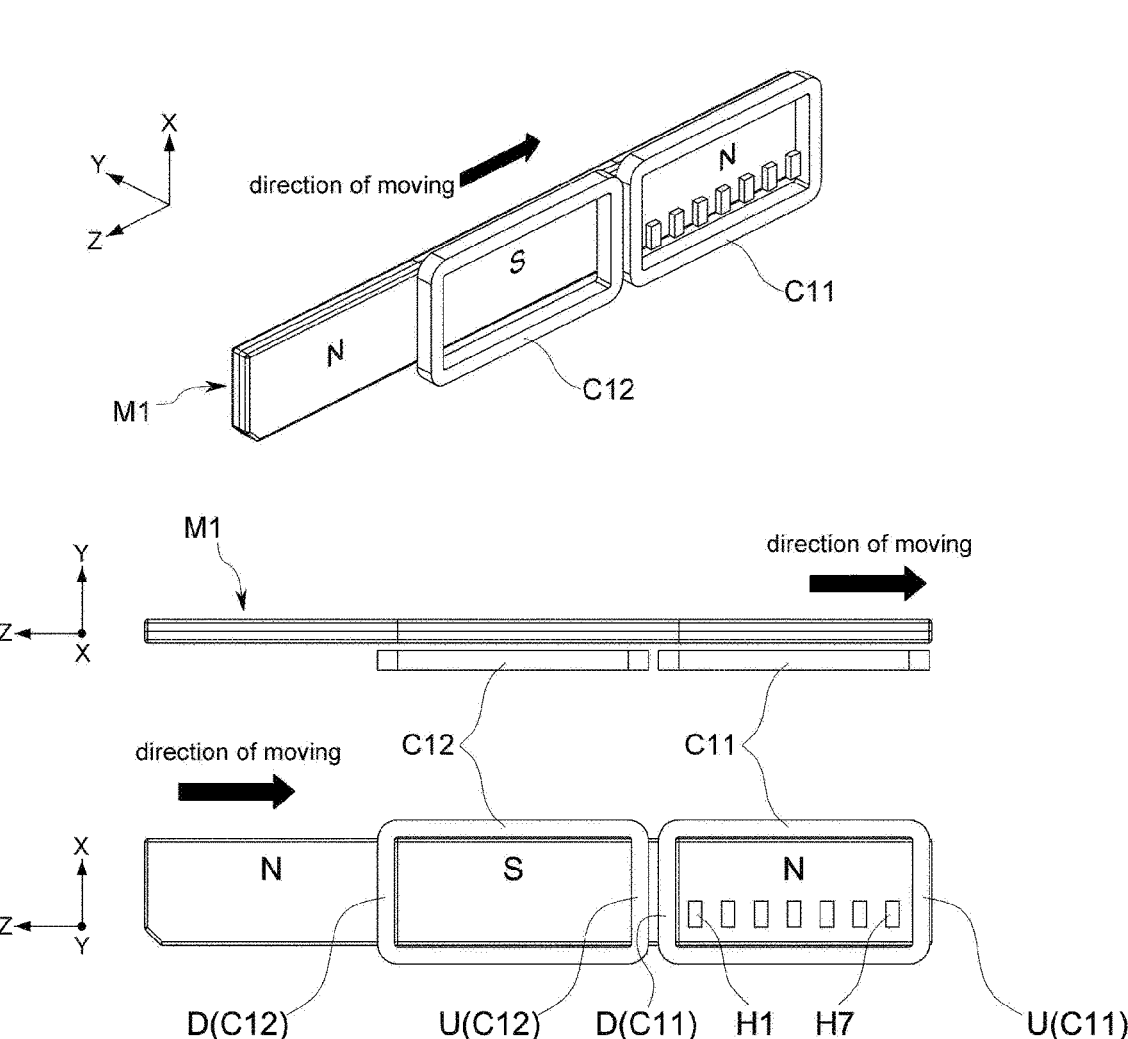
FIG. 6 is a diagram showing the relationship among the coil, the magnet, and the hall sensor based on start positions.

FIG. 6 is a diagram showing the specific relationship among the coil C1, the magnet M1, and the hall sensor H based on the start position. As described above, the positional relationship of each component shown in FIG. 6 corresponds to the positional relationship when the reference position is a starting point where the zoom operation begins.

Since the coils C11, C12 are mainly configured in a wound form, they have a track shape, and a driving force is generated in an area in a direction perpendicular to the optical axis direction (Z-axis direction) in relationship with the facing magnet M1.

In the following description, among two areas perpendicular to the optical axis direction in the track shapes of each of the coils C11, C12, an upper area (based on the optical axis direction) is referred to as an upper part U, and a lower area is referred to as a lower part D.

In addition, among the coils C11, C12, the coil located above or upward based on the optical axis direction is referred to as upper coil C11, and the coil located below is referred to as a lower coil C22. In other words, based on two adjacent coils among m (m is a natural number of 2 or more) coils, the coil located upward becomes the upper coil, and the coil located below the upper coil becomes the lower coil.

The zoom function may be implemented if the magnet M1 has two or more magnetic poles (magnetic poles facing the coil), but it is preferred that the magnet M1 has three or more magnetic poles (magnetic poles facing the coil), so that the driving force may be generated not only in the area (U, D) where the driving force is generated in the upper coil C11 but also in the area (U, D) where the driving force is generated in the lower coil C12, namely in all of 4 areas (based on the embodiment shown in the drawing).

Specifically, the magnet M1 may be configured to include a middle magnetic pole (part 2) located in the center portion and having one of the N pole and the S pole, an upper magnetic pole (part 1) having an opposite polarity to the middle magnetic pole (part 2) and located at the upper portion based on the optical axis direction, and a lower magnetic pole (part 3) having an opposite polarity to the upper magnetic pole (part 1) and the middle magnetic pole (part 2) and located at the lower portion based on the optical axis direction.

In this case, among the plurality of coils C1, it is preferable that the lower part (D C11) of the upper coil C11 and the upper part (U C12) of the lower coil C12 are configured to simultaneously face the middle magnetic pole (part2) at the reference position.

All of the plurality of hall sensors H, H1 to H7 according to the present disclosure described above are disposed in the inner space of the winding of the upper coil C11 at the positions all facing the first reference magnetic pole, which is the magnetic pole (part 1, N pole based on the drawing) corresponding to the highest magnetic pole (based on the optical axis) of the magnet M1.

Since the plurality of hall sensors H, H1 to H7 all have to face the same one magnetic pole among the magnetic poles of the magnet M1, depending on an embodiment, the plurality of hall sensors H, H1 to H7 may also be disposed at positions that all face the middle magnetic pole (part 2, S pole based on the drawing), rather than the highest magnetic pole (part 1) as in the above embodiment.

In this case, the plurality of hall sensors H, H1 to H7 may be disposed in the inner space of the lower coil C12 or an area adjacent to the lower coil C12.

Figure 7:
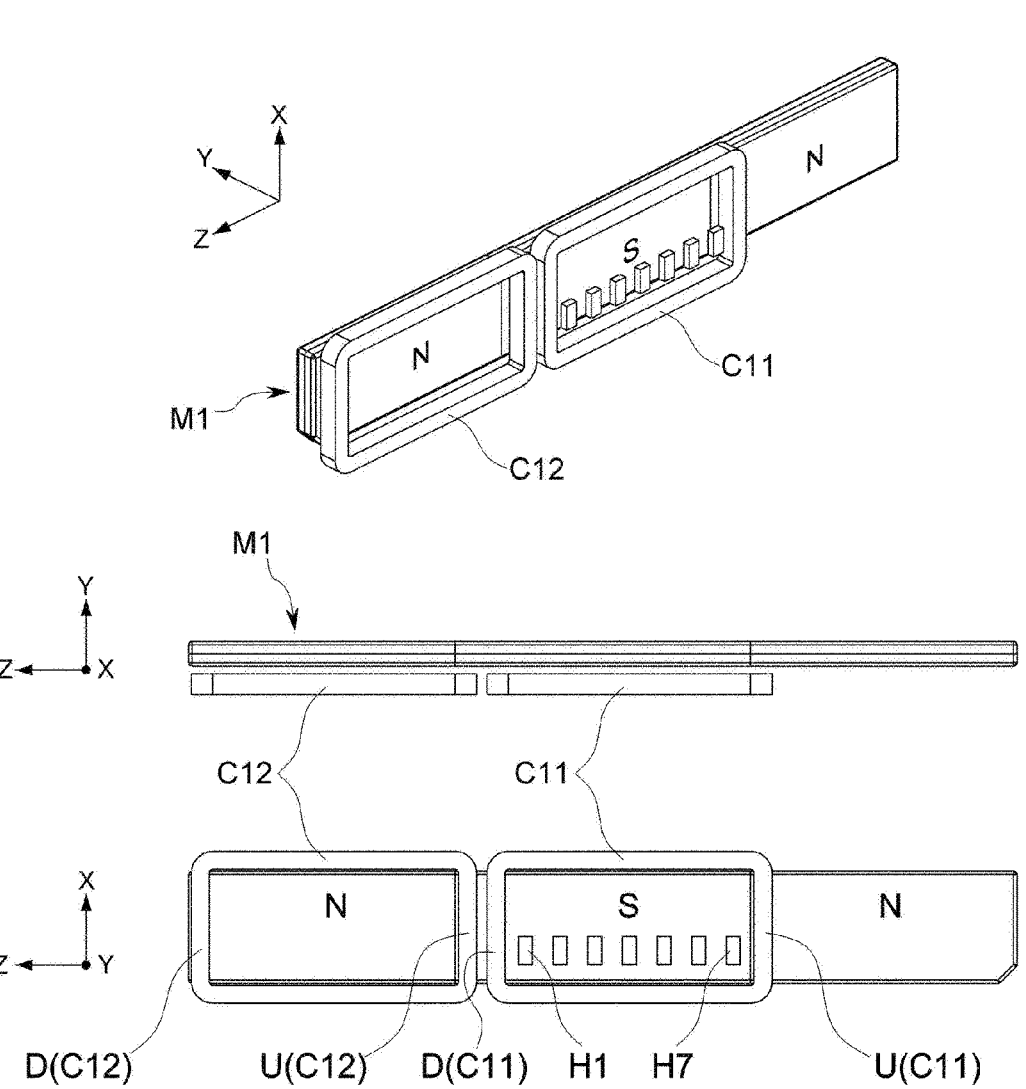
FIG. 7 is a diagram showing the relationship among the coil, the magnet, and the hall sensor based on end positions.

FIG. 7 is a diagram showing the specific relationship between the coil C1, the magnet M1, and the hall sensor H based on the end position.

If the start position illustrated in FIG. 6 is a position at which the carrier 120 is located at one end of the movable area of the carrier 120, the end position in FIG. 7 corresponds to a position at which the carrier 120 is located at the other end of the movable area.

If the carrier 120 is located at the other end of the movable area as above, all of the plurality of detection sensors (hall sensors) H, H1 to H7 are configured to face a magnetic pole having a polarity different from the first reference magnetic pole, as the same one magnetic pole among the magnetic poles of the magnet M1.

If the plurality of detection sensors H, H1 to H7 are all located inside the upper coil C11 at the start position and face the highest magnetic pole (N pole) among the magnetic poles of the magnet M1, when the carrier 120 is located at the end position, the plurality of detection sensors H, H1 to H7 are all configured to face the S pole, which is the middle magnetic pole (part2) among the magnetic poles of the magnet M1.

Based on the embodiment shown in the drawing, it is desirable that the average length (based on the optical axis direction) of one magnetic pole (part1, part2, part3) of the magnet M1 is designed to correspond to the size or length of the movable area of the carrier 120, and the total length of the plurality of hall sensors H1 to H7 (based on the optical axis direction), namely the distance from H1 to H7, is designed to be smaller than the length of one magnetic pole of the magnet M1.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

In the above description of this specification, the terms such as "first" and "second" etc. are merely conceptual terms used to relatively identify components from each other, and thus they should not be interpreted as terms used to denote a particular order, priority or the like.

The drawings for illustrating the present disclosure and its embodiments may be shown in somewhat exaggerated form in order to emphasize or highlight the technical contents of the present disclosure, but it should be understood that various modifications may be made by those skilled in the art in consideration of the above description and the illustrations of the drawings without departing from the scope of the present invention.

What is claimed is:

1. An actuator for a camera, comprising:
a carrier equipped with at least one lens and configured to move in an optical axis direction;

a single magnet provided in the carrier;
a housing configured to accommodate the carrier;
a plurality of coils arranged along an optical axis to face the single magnet; and
a plurality of detection sensors configured to sense a position of the single magnet and disposed to be spaced apart from each other based on the optical axis direction,
wherein, when the carrier is located at a reference position, the plurality of detection sensors all face the same one magnetic pole among magnetic poles of the single magnet and the same one magnet pole which the plurality of detection sensors all face is a physically same one magnet pole.

2. The actuator for a camera according to claim 1, wherein the plurality of detection sensors are all provided inside one coil among the plurality of coils.

3. The actuator for a camera according to claim 1, wherein the reference position is a position where the carrier is located at one end of a movable area in which the carrier is movable.

4. The actuator for a camera according to claim 3, wherein when the carrier is located at the other end of the movable area, the plurality of detection sensors all face the same one magnetic pole among the magnetic poles of the magnet, and the magnetic pole has a different polarity from a magnetic pole that the plurality of detection sensors all face when the carrier is located at one end of the movable area.

5. The actuator for a camera according to claim 1, wherein the magnet includes:
a middle magnetic pole located in a center portion and having one of an N pole or an S pole; and
an upper magnetic pole and a lower magnetic pole having an opposite polarity to the middle magnetic pole and located at upper and lower portions of the middle magnetic pole, respectively, based on the optical axis direction.

6. The actuator for a camera according to claim 5, wherein when the carrier is located at the reference position, a lower portion of an upper coil located above based on the optical axis among the plurality of coils and an upper portion of a lower coil located below based on the optical axis face the middle magnetic pole.

\* \* \* \* \*